United States Patent
Dysinger et al.

(10) Patent No.: US 9,021,775 B2
(45) Date of Patent: May 5, 2015

(54) HARVESTER FOR LEAFY VEGETABLES

(71) Applicant: Farmer's Friend, LLC, Williamsport, TN (US)

(72) Inventors: Jonathan Dysinger, Williamsport, TN (US); Ronald Christenson, Parsons, TN (US)

(*) Notice: Subject to any disclaimer, the term of this patent is extended or adjusted under 35 U.S.C. 154(b) by 130 days.

(21) Appl. No.: 13/761,573

(22) Filed: Feb. 7, 2013

(65) Prior Publication Data

US 2014/0215990 A1 Aug. 7, 2014

(51) Int. Cl.
*A01D 34/00* (2006.01)
*A01D 45/28* (2006.01)
*A01D 45/26* (2006.01)

(52) U.S. Cl.
CPC .............. *A01D 45/28* (2013.01); *A01D 45/263* (2013.01)

(58) Field of Classification Search
USPC ....................... 56/14.5, 33, 127, 34, 11.9, 246
See application file for complete search history.

(56) References Cited

U.S. PATENT DOCUMENTS

| | | | | |
|---|---|---|---|---|
| 2,270,646 A * | 1/1942 | Campbell | ....................... | 56/14.4 |
| 2,449,042 A * | 9/1948 | Abbrecht | ......................... | 56/249 |
| 3,538,690 A * | 11/1970 | Hinks et al. | .................... | 56/17.6 |
| 3,698,171 A * | 10/1972 | Hecht | ............................. | 56/331 |
| 3,973,378 A * | 8/1976 | Bartasevich et al. | .......... | 56/11.9 |
| 4,516,390 A * | 5/1985 | Klinner | ............................ | 56/364 |
| 4,790,128 A * | 12/1988 | Klinner | ............................ | 56/364 |
| 5,035,109 A * | 7/1991 | van den Top | ................ | 56/327.1 |
| 6,314,707 B1 * | 11/2001 | Ryan | ................................ | 56/246 |
| 6,698,177 B1 * | 3/2004 | Akehi et al. | ..................... | 56/236 |
| 7,520,118 B1 * | 4/2009 | Priepke | ............................ | 56/257 |

* cited by examiner

*Primary Examiner* — Árpád Fábián-Kovács
(74) *Attorney, Agent, or Firm* — Bradley Arant Boult Cummings, LLP (57) ABSTRACT

A harvester having one or more cutting blades for cutting leafy vegetables with a rotating brush for sweeping harvested leaves into a basket or enclosure. The blades are driven by an oscillatory drive mechanism. The brush may have limp bristles. The harvester may be hand-carried and operated by a motor, which drives both the brush and the cutting blades.

8 Claims, 7 Drawing Sheets

HARVESTER FOR LEAFY VEGETABLES

FIELD OF THE INVENTION

The invention relates generally to an apparatus and method for harvesting leafy vegetables.

BACKGROUND ART

Advances in the cultivation of leafy vegetables, such as spinach, lettuce, and various types of greens (e.g., collard, mustard, or turnip greens), have created a need for a comparatively inexpensive and portable harvester to harvest such vegetables. Many types of leafy vegetables have loose leaves and stems (as opposed to leafy vegetables that grow in "heads" of compacted leaves, such as certain types of lettuce). Current cultivation practices of loose leaf vegetables include planting the vegetables very densely, such that the leaves of each plant grow generally upward and are supported by the leaves of adjacent plants. While this increases the yield per acre of the vegetables, it also presents obstacles to harvesting the leaves. First, the leaves tend to bunch together near the combine teeth or cutting blade. As the mass of leaves near the teeth or blade increases, they begin to push other plants forward as the blade nears. This causes the blade to cut at a diagonal angle rather than substantially perpendicular to the leaf, thereby reducing the yield and resulting in unsightly partially-cut leaves, which are disfavored by consumers. This problem is even more acute in years of poor harvests, because the plants grow less densely and the leaves tend to spread outward rather than grow upward. Second, the leaves tend to bruise and damage easily. Furthermore, although industrial harvesters are available for large, industrialized farms harvesting thousands of acres, even the least expensive of these harvesters cost tens of thousands of dollars. The size and cost of these harvesters render them impracticable for use with smaller operations, such as family farms or farms that sell goods at farmers' markets or to groceries and restaurants specializing in locally grown foods.

Furthermore, even large industrial harvesters use a combine mechanism to motivate cut leaves onto a conveyor belt. Combine paddles are located forward of the cutting mechanism and motivate the leaves into the mechanism, but this can also result in the accumulation of leaves on the cutting mechanism.

What is needed, then, is a harvester for leafy vegetables that prevents leaves from bunching near the blade and does not bruise or damage the leaves.

SUMMARY OF THE INVENTION

In some aspects, the invention relates to a harvester for leafy vegetables having a frame, a motor secured to the frame, the motor comprising a rotary shaft, a rotatable brush mounted to the frame and connected to the rotary shaft, the brush comprising multiple bristles, an oscillatory drive mechanism connected to the rotary shaft, a cutting blade mounted to the frame below the bristles and secured to the oscillatory drive mechanism, and an enclosure for collecting cut leaves.

In other aspects, the invention relates to a mechanism for harvesting leafy vegetables having a frame, a cutting blade attached to the frame, a rotatable brush mounted to the frame above the cutting blade and comprising multiple bristles, and an enclosure for collecting cut leaves.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

Figure 1:
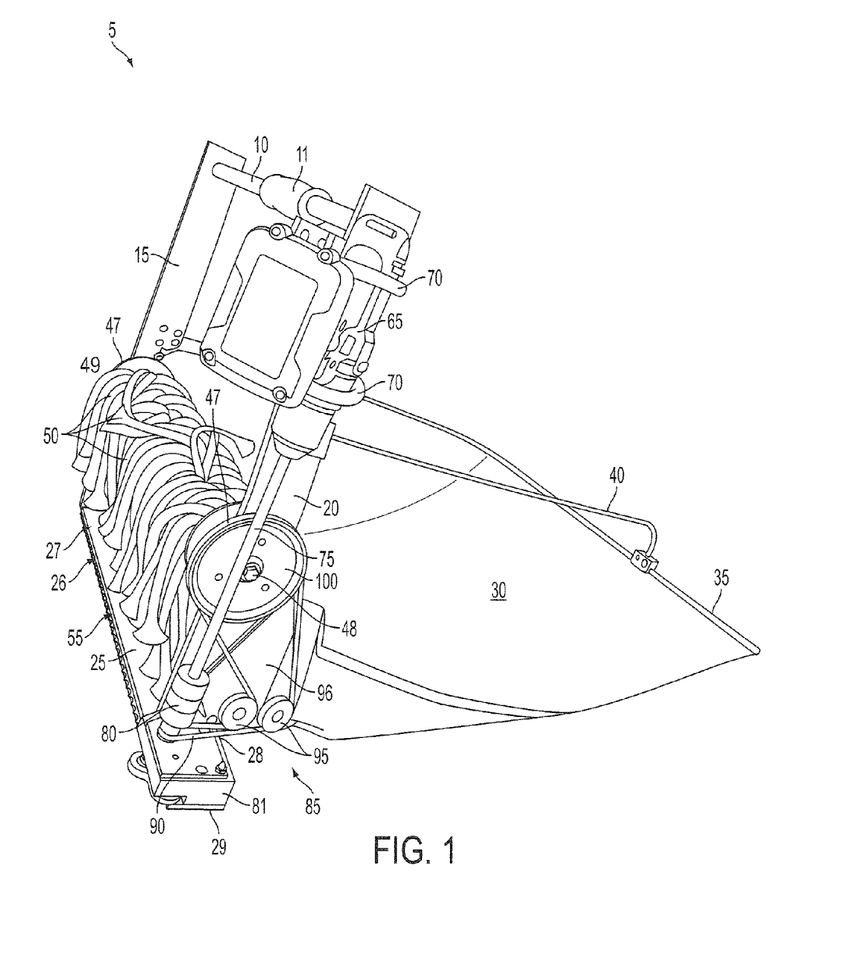
FIG. 1 is a perspective view of the harvester according to one embodiment of the invention.

FIG. 1 depicts an embodiment of a harvester according to the present invention. The harvester has a frame 5 with basket 30, a rotating brush 49 with bristles 50, and one or more blades 55 attached to the frame 5. The frame 5 may have any shape that supports the motor 65, brush 49 and blades 55. In the embodiment depicted, the frame 5 has a handle 11 along the top member 10, two side members 15 and 20, and a bottom member 25. However, in some embodiments, the frame may be arc-shaped or circular, have a unitary construction, or have some other shape conducive to handling or pulling the harvester without departing from the scope of this invention.

The handle 11 allows a user to carry and operate the harvester by hand. In other embodiments, the harvester may be adapted to have a hitch (not shown) or neck (not shown) mounted to the frame 5 to allow the harvester to be pulled by a riding lawnmower, ATV, or other vehicle. Additionally, the harvester may be scaled upward to be adapted to an industrial-sized combine or harvester, such that the rotating brush 49 and blades 55 are attached to a large-scale harvester or combine and urge the cut leaves into a conveyor belt (not shown) for conveying the cut leaves to a basket or other enclosure for collecting cut leaves.

In some embodiments, the bottom member 25 has a slot 27 along the front edge 26 to hold one or more blades 55. In other embodiments, as in FIG. 1, a plate 29 may be attached above or below the bottom member 25 in an offset manner, such that a slot 27 is formed with the blades 55 set within. In still other embodiments, no slot may be used, and the blades 55 may be exposed, although this is not preferable due to the increased risk of injury. At least one cutting blade 55 is mounted within the slot 27, and the cutting edge 56 of the blade 55 extends beyond the front edge 26 of the bottom member 25 and plate 29, if the plate 29 is used. The blades 55 are attached to the bottom member 25 by a pin 60 (depicted in FIG. 3). Each blade has an oblong aperture (not shown) through which the pin 60 engages and holds the blade 55 within the slot 27. The oblong aperture allows the blade to move back and forth parallel to the front edge 26 as the blade 55 is driven by the motor 65. In order to clean or change out blades 55 while not in operation, the user may remove the pin 60, which allows the blades 55 to swing out and be cleaned or removed. Afterwards, the user may replace the blades 55 in their original position and reinsert the pin 60. The manner in which the cutting blades 55 are driven by the motor 65 and rotary shaft 75 is further explained below with reference to FIG. 7.

The brush 49 (depicted in FIG. 3) is mounted between the side members 15 and 20 in any manner to allow it to rotate freely about its longitudinal axis. The brush 49 has an axle 45 and bristles 50. In the embodiment depicted in FIG. 1, ball bearings 46 (depicted in FIG. 5) engage the axle 45 and allow the axle 45 to rotate with minimal friction. The axle 45 should be of a sufficient distance from the bottom member 25 to allow the bristles 50 to sweep the cut leaves away from the blade 55. Preferably, the distance between the bottom member 25 and the axle 45 is also sufficient to allow the axle 45 to pass over the top of the leafy vegetables being harvested, in order to prevent those vegetables from being pushed forward by the axle 45 or the bristles 50. However, it is not necessary that the harvester have that distance between the axle 45 and the bottom member 25. Also, the axle 45 may be horizontally offset behind the front edge 26 of the bottom member 25. This allows the cutting blade 55 to cut the vegetables prior to the harvested leaves being swept by the bristles 50.

The motor 65 and drive assembly 85 rotate the brush 49 when the motor 65 is engaged, as further discussed below with reference to FIGS. 4 and 7. The brush 49 has multiple bristles 50 attached to the body of the axle 45. As the axle 45 rotates, the bristles 50 extend out from the axle 45 and sweep over the space above the blades 55 to sweep harvested leaves into the basket 30. In some embodiments, the bristles 50 have a length extending to just above the bottom member 25 when hanging downward from the axle 45. However, as depicted in FIG. 1, it is not necessary that the bristles 50 be of uniform length, so long as they do not interfere with or snag on the blade 55.

As depicted in FIG. 1, the bristles 50 are constructed of soft, limp material. Limp bristles 50 are less likely to bruise or damage harvested leaves than are stiff bristles 50. However, a harvester may have either limp or stiff bristles 50, or a combination of both, without departing from the scope of this disclosure. As further depicted in FIG. 1, the axle 45 may also have guides 47 located near the side members 15 and 20. These guides 47 direct bristles 50 near the side members 15 and 20 downward toward the blade and prevent the bristles 50 from slapping against the side members 15 and 20. Other embodiments may not have guides 47 at all. For example, guides 47 would not be needed if stiff bristles 50 are used.

In the embodiment depicted in FIG. 1, the bristles 50 sweep harvested leaves from the cutting blade 55 into the basket 30. The basket 30 is attached along the rear edge 28 of the bottom member 25 and along at least one side member 15 or 20. In the embodiment of FIG. 1, the basket 30 is attached only to side member 15, and the back and other side of the basket 30 are open. The basket 30 may be made of any flexible or rigid material capable of catching and storing harvested leaves. For example, any type of fabric, canvas, mesh, plastic, wood, metal, or other material of sufficient strength to hold harvested leaves may be used. In embodiments such as FIG. 1 where the material is flexible or limp, a metal rim 35 may be attached to the open edge of the basket 30 to support the basket 30 and create a suitable container for collecting the harvested leaves. Additionally in FIG. 1, a small support member 40 also extends from side member 20 to the rear edge of the basket 30 to support the basket 30. However, not all embodiments have a rim 35 or support member 40, and persons having skill in the art will recognize other enclosing or collective structures, such as bags or tubes, to collect harvested leaves without departing from the scope of the invention.

In other embodiments, the basket 30 may be replaced by a conveyor belt (not shown) or other system typically used in large-scale combines or harvesters to transport harvested leaves from the cutting blade and combine paddles to a basket, bin, or other harvesting enclosure. Such a remote storage or collection mechanism may be used in place of the basket depicted in FIG. 1 without departing from the scope of this disclosure.

FIG. 1 also has a general depiction of the motor 65, rotary drive shaft 75, and drive assembly 85, which operate in conjunction to rotate the brush 49 and the blades 55. The motor 65 may be any electrical motor operable to drive rotary drive shaft 75 with sufficient torque to drive the blades 55 and brush 49. The motor 65 may be powered by any electrical means and by AC or DC current. For example, in some embodiments, the motor 65 may be connected by electrical cord to a standard 120V AC circuit. In other embodiments, the motor 65 may be battery-powered. In the embodiment shown in FIG. 1, the motor 65 is a standard battery-powered hand drill that is attached to the side member 20 by two U-bolts 70. This particular embodiment allows the user to carry the harvester by holding the handle 11 with one hand and the motor 65 with the other while maintaining constant control of the operation of the motor 65. However, such user control or handling is not necessary in every embodiment. For example, the motor 65 may also be a standard DC motor integrated into the frame 5 with an on/off switch (not shown). The motor 65 may also be positioned near the bottom member 25, such that the rotary shaft 75 is very short, without departing from the scope of this disclosure.

The motor 65 drives a rotary shaft 75. The rotary shaft 75 may be a rigid cylindrical shaft that connects the motor 65 to the drive mechanism 105 for operating the blades 55. The oscillatory drive mechanism 105 for the blades 55 is housed in FIG. 1 by a cover 81 to protect the user from the rapid movement of the drive mechanism 105. The oscillatory drive mechanism 105 and operation of the blades 55 is further explained with reference to FIG. 7 below. In FIG. 1, where the motor 65 is a standard drill that is detachable from the harvester, the rotary shaft 75 is also detachable. In this embodiment, the shaft 75 engages a drive pulley 80 that is mounted to the bottom member 25 in a manner that allows the block 80 to rotate freely about its Z-axis. Any structure for rotationally coupling the rotary shaft 75 to the drive pulley 80 may be used. For example, in the embodiment shown in FIG. 1, a standard two-prong coupler is attached to the top of the drive pulley 80, and a corresponding two-prong coupler is attached to the end 76 of the rotary shaft 75. When the motor 65 and rotary shaft 75 are attached, the end 76 of the rotary shaft 75 engages the block 80 to drive the rotary motion. The drive pulley 80 then drives the oscillatory drive mechanism 105. In other embodiments, where the motor 65 is not detachable from the frame 5, the motor 65 may directly drive the drive pulley 80, or the drive pulley 80 may be integrated with the rotary shaft 75 in a unitary construction.

The drive assembly 85 transfers the rotary motion of the rotary shaft 75 to the wheel 100 and brush 49. The wheel 100 is connected directly to the axle 45 by a bolt 48. Any drive assembly 85 capable of transferring the power supplied by the motor 65 to the wheel 100 and axle 45 may be used. For example, a gear drive assembly may be used. In a gear drive, the rotary shaft 75 would have gear teeth (not shown) capable of driving one or more gears (not shown) that are designed to drive the wheel 100. Other possible drive assemblies include a belt drive or chain drive assembly, as further explained below, or a direct drive assembly, where the rotary shaft 75 directly drives the wheel 100 and a secondary mechanism (not shown) drives the blades 55.

FIG. 1 depicts a belt drive assembly 85 for driving the wheel 100 and brush 49 in accordance with one embodiment of the invention. A belt 90 is run about the rotary shaft 75 and then passes over a pulley 95, the wheel 100 for driving the axle 45, a second pulley 95, and then back to the rotary shaft 75. The two pulleys 95 direct the belt 90 onto the wheel 100 in a manner that allows the belt 90 to contact a sufficiently large arc length of the wheel 100 to rotate the wheel 100. The pulleys 95 are mounted to a pulley mount 96 that attaches to the side member 20. The wheel rotation also causes the axle 45 to rotate. In some belt drive assemblies 85, the belt 90 may pass directly between the rotary shaft 75 and the wheel 100. In other assemblies 85, any number of pulleys 95 may be used to direct the direct the belt 90 as necessary or desired. Where the motor 65 and rotary shaft 75 are detachable, the belt 90 may pass around the drive pulley 80 rather than directly around the rotary shaft 75.

Figure 2:
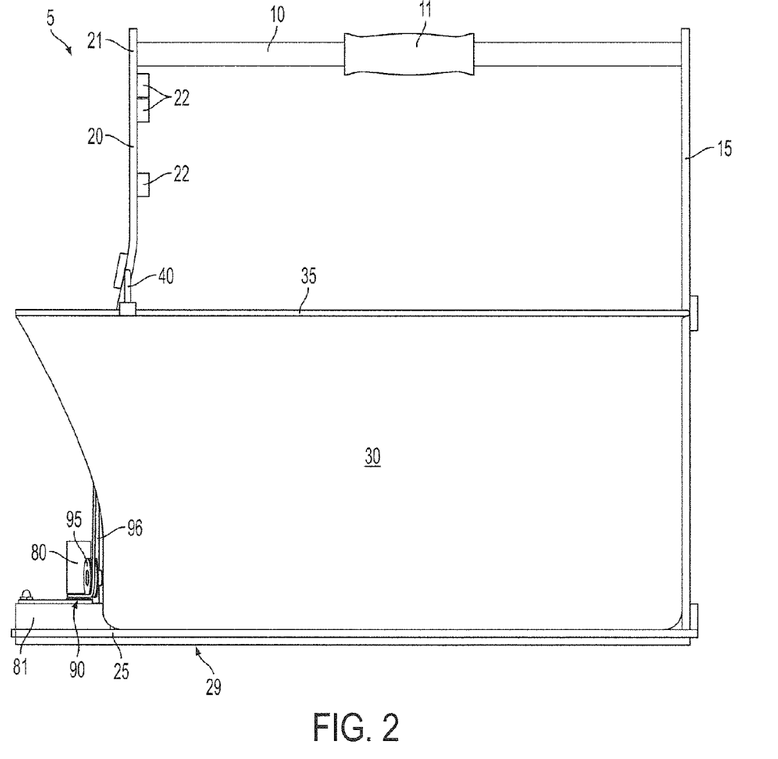
FIG. 2 is a rear elevation view of the harvester according to one embodiment of the invention.

FIG. 2 depicts a rear elevation view of one embodiment of the harvester. A handle 11 is depicted along the top member 10. The basket 30 is supported by the support member 40 and the rim 35, both of which extend out the back of the frame 5 from the side members 15 and 20. As depicted, the basket 30 extends and attaches to the bottom member 25. The plate 29 (depicted in FIG. 7) attaches along the bottom of the bottom member 25. Along the top end 21 of side member 20 are multiple mounts 22, where the U-bolts 70 for engaging a detachable motor 65 may be screwed in. Attached to the bottom member 25 is the cover 81 for covering the oscillatory drive mechanism 105. The drive pulley 80 is mounted to the top of the cover 81 in a manner that allows the drive pulley 80 to freely rotate. For example, the drive pulley 80 may be mounted using ball bearings, such that the drive shaft 117 (shown in FIG. 7) may pass to the oscillatory drive mechanism 105. The drive pulley 80 is capable of engaging a detached rotary shaft 75, as depicted in FIG. 1. The belt 90 passes along a pulley 95 mounted the pulley mount 96.

Figure 3:
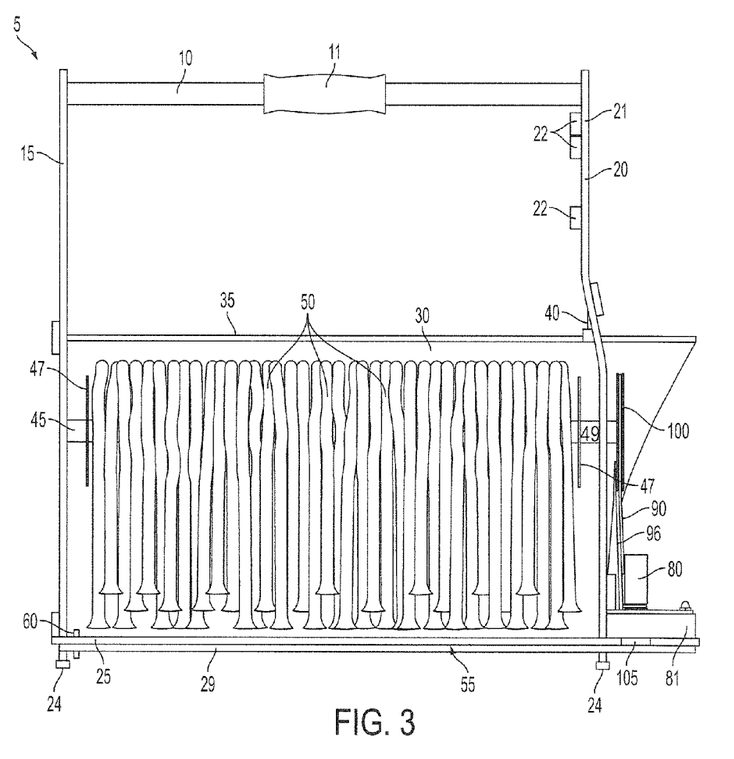
FIG. 3 is a front elevation view of the harvester according to one embodiment of the invention.

FIG. 3 depicts a front elevation view of one embodiment of the harvester. The frame 5 with top member 10, side members 15 and 20, and bottom member 25 is shown. In this embodiment, feet 24 extend below each side member 15 and 20. The feet 24 may be used to set a height for the blades 55 above the ground. Additionally, in some embodiments, the feet 24 may be adjustable so that the user can set the cutting blades 55 to a desired height.

Along the top member 10 is a handle 11. The brush 49 passes between the two side members 15 and 20 and is lined with multiple bristles 50. Ball bearings (not shown) allow the axle 45 of the brush 49 to rotate freely about its horizontal axis. The axle 45 is connected to the wheel 100. Two guides 47 bound the bristles 50 near each side member 15 and 20. The bristles 50 hang loosely to a distance just above the blade 55. The blade 55 is set along the bottom member 25, as described further with reference to FIG. 1 above. Behind the bristles 50 is the basket 30, supported by the rim 35 and support member 40. As discussed with reference to FIG. 1, when operational, the bristles 50 sweep the harvested leaves into the basket 30 as they are cut by the blades 55.

Along the side member 20, the wheel 100 is driven by the belt 90. The belt 90 passes around the drive pulley 80. Below the drive pulley is the oscillatory drive mechanism 105 for driving the blade 55, as is further discussed with reference to FIG. 7 below. Along the top end 21 of the side member 20 are mounts 22 for mounting the U-bolts 70 to support a detachable motor 65.

Figure 4:
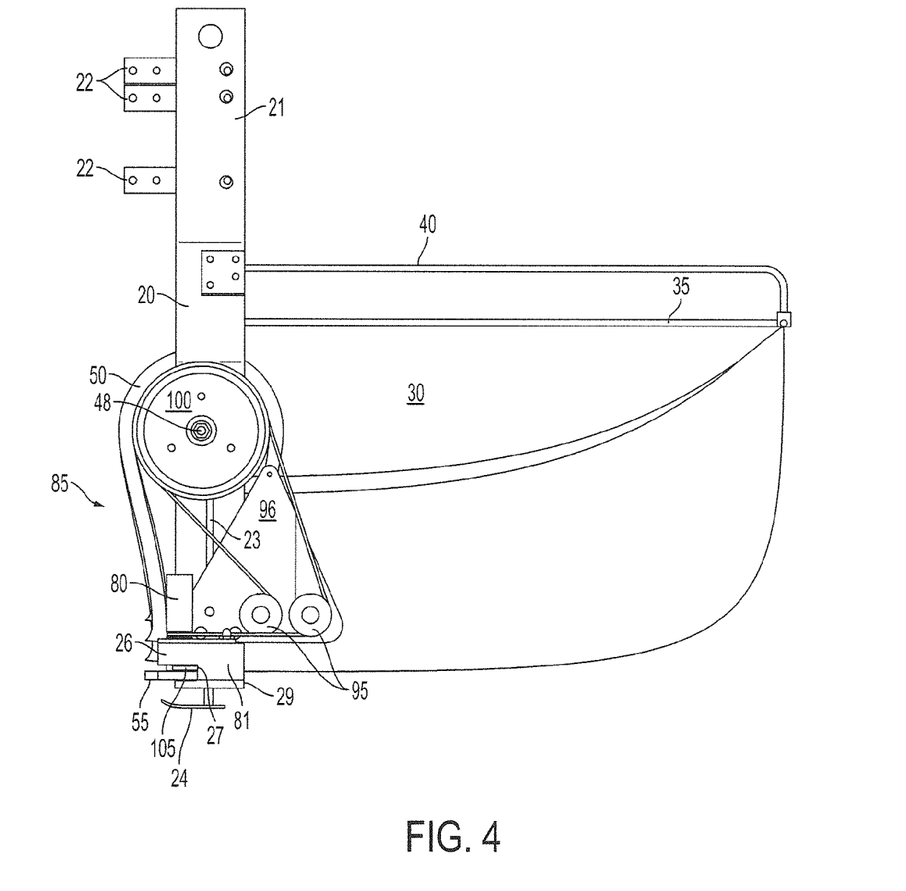
FIG. 4 is first side elevation view of the harvester according to one embodiment of the invention.

FIG. 4 depicts a first side elevation view of one embodiment of the harvester. Side member 20 extends vertically upward from bottom member 25. Along the top end 21 of side member 20 are multiple mounts 22 for attaching U-bolts 70 (as shown in FIG. 1) to support a detachable motor 65. The blades 55 sit within the slot 27 formed by the front edge 26 of the bottom member 25 and the plate 29. The blade 55 is driven by the oscillatory drive mechanism 105 as further described with reference to FIG. 7. The cover 81 houses the oscillatory drive mechanism 105. Directly above the drive mechanism 105, on the top side of the cover 81, is the drive pulley 80. When in operation, the drive pulley 80 drives the oscillatory drive mechanism 105 and the belt drive assembly 85. The belt 90 passes around the drive pulley 80 to a pulley 95, then around the wheel 100, then back to a second pulley 95 and the drive pulley 80. The pulleys 95 are mounted to a pulley mount 96, which is mounted against the bottom member 25 and the side member 20. The wheel 100 is connected to the axle 45 (shown in FIG. 3) by a bolt 48. Draped about the axle 45 are bristles 50. As described with reference to FIG. 1, when in operation the bristles 50 sweep harvested leaves into the basket 30. The basket is supported by a rim 35 and a support member 40.

Figure 5:
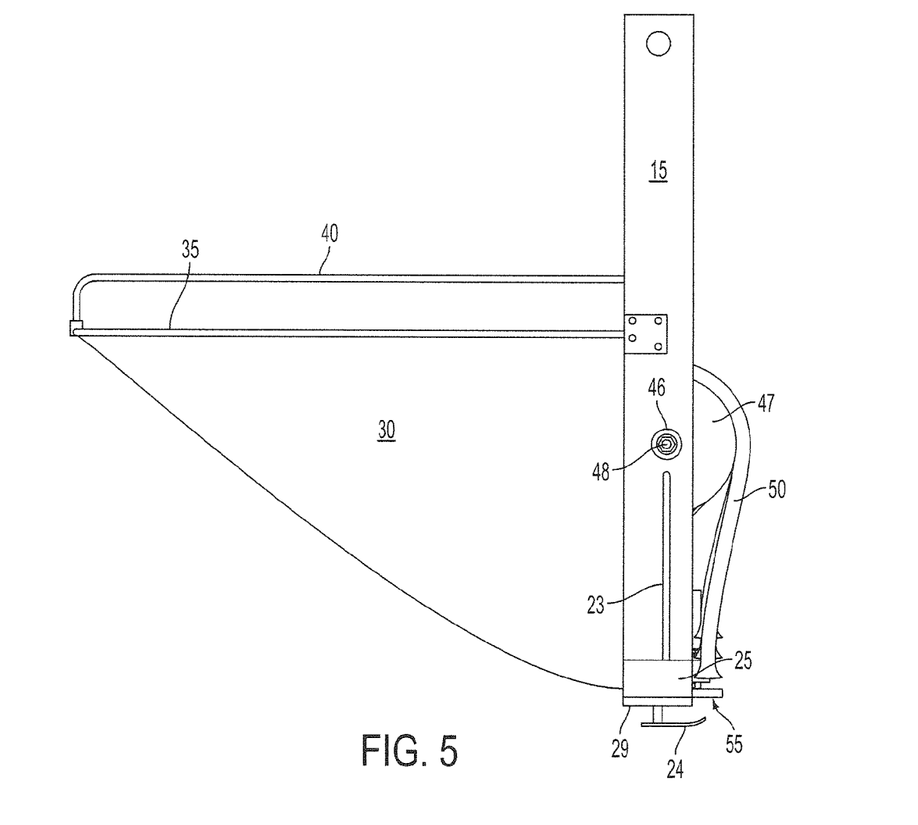
FIG. 5 is a second side elevation view of the harvester according to one embodiment of the invention.

FIG. 5 depicts a second side elevation view of an embodiment of a harvester. The basket 30, supported by the rim 35 and the support member 40, extends away from side member 15. Near the middle of the side member 15, the axle 45 is held in place by a bolt 48, and ball bearings 46 allow the axle 45 to rotate freely about its horizontal axis. The guide 47 directs the bristles 50 downward and away from the side member 15. The side member 15 is attached to the bottom member 25. The cutting blades 55 extend out from the front of the bottom member 25. Below the bottom member 25 and the plate 29, a foot 24 may be used to set cutting blades 55 some distance above the ground while harvesting. This prevents the blades 55 from either hitting the ground during operation, which may damage the blades 55, or from cutting the vegetables being harvested too close to the ground. Additionally, in some embodiments, the feet 24 may be adjustable. In FIG. 5, a stem 23 running along the side member 15 and connects to the foot 24. This allows the foot 24 to be adjusted by sliding the stem 23 up or down to set the foot 24 at a desired height.

Figure 6:
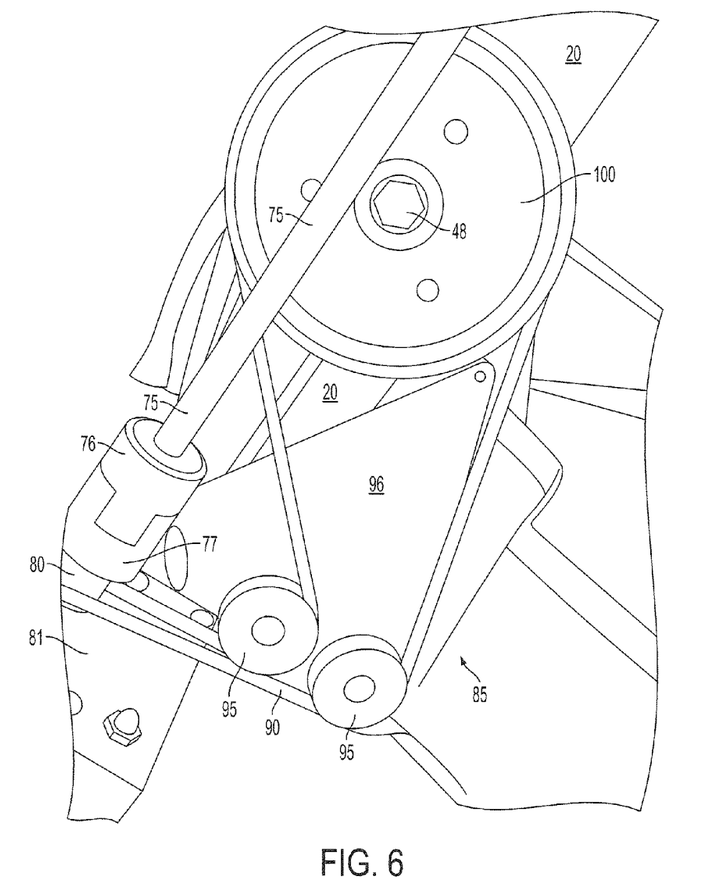
FIG. 6 is close up view of the belt drive assembly according to one embodiment of the invention.

FIG. 6 depicts a close-up view of the drive assembly 85 for driving the brush 49 according to one embodiment of the harvester. In this embodiment, the drive assembly 85 is a belt drive assembly. Here the rotary shaft 75 extends down and couples to the drive pulley 80. To engage the drive pulley 80, the end 76 of the rotary shaft is a coupling that engages with a corresponding coupling 77 attached to the drive pulley 80. Wrapped around the drive pulley 80 is a belt 90. The belt 90 passes around a series of pulleys 95 to a wheel 100. As the shaft 75 rotates the block 80, the belt 90 is drawn about the block 80, causing the wheel 100 to rotate. The wheel 100 is attached to the axle 45 (not shown in FIG. 6) by a bolt 48. The pulleys 95 are mounted to a pulley mount 96. The pulley mount 96 is mounted to the side member 20 and the cover 81.

As described above, any number of variations are possible. For example, any number of pulleys 95 may be used to align the belt 90 to pull the wheel 100. Also, in some embodiments where the motor 65 and rotary shaft 70 are not detachable, the rotary shaft 70 may be integrated with the drive pulley 80 to form a unitary rotating unit for driving the drive assembly 85. Alternatively, the motor 65 may directly engage the drive pulley 80. In some embodiments, the size of the wheel 100 may be varied to change the angular velocity of the brush 49. A larger wheel 100 will result in a slower angular velocity, while a smaller wheel 100 will have a faster angular velocity.

Furthermore, other types of drive assemblies may be used without departing from the scope of this disclosure. For example, a direct drive assembly, whereby a motor 65 directly rotates the wheel 100, may also be used in place of the belt drive 85 depicted in FIG. 6. In such a direct drive configuration, either a second motor may be used to drive the blades 55 independently from the wheel 100, or a belt may be used to drive the blades 55 by relying upon the rotational motion of the direct drive of the motor. A gear drive ay also be used.

Figure 7:
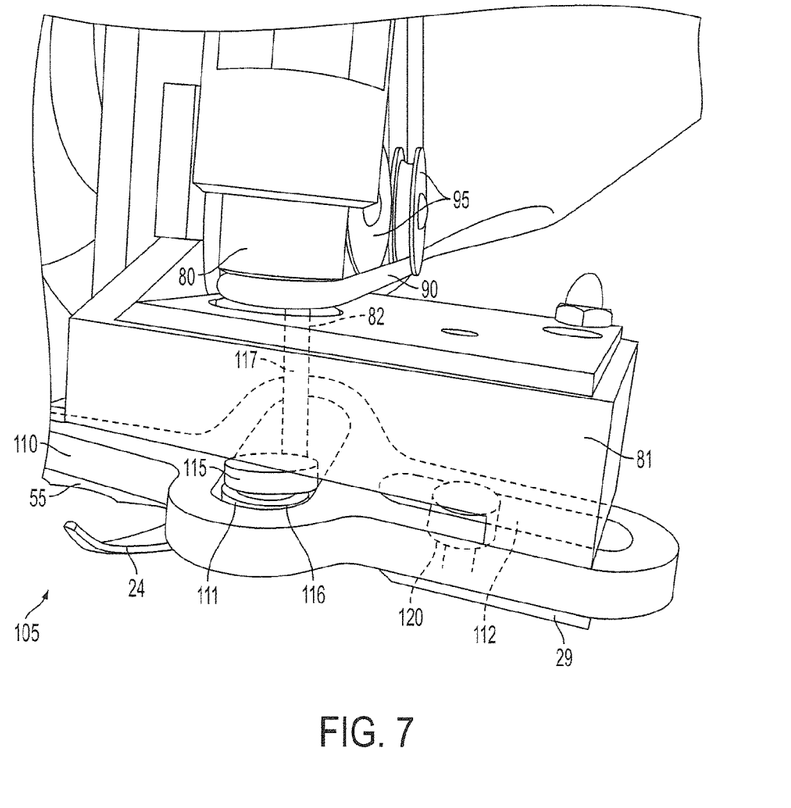
FIG. 7 is a close up view of the oscillation drive mechanism according to one embodiment of the invention.

FIG. 7 depicts one embodiment of the oscillatory drive mechanism 105 for the harvester. The blade 55 is secured to the underside of a oscillating frame 110. The oscillating frame 110 is partially housed within the cover 81 in order to protect the user, but it is not necessary that the oscillating frame 110 be covered or completely enclosed. The oscillating frame 110 is free to move back and forth between the cover 81 and the bottom plate 29. The oscillating frame 110 has two elongated apertures, a perpendicular aperture 111 and a parallel aperture 112. The perpendicular aperture 111 is perpendicular to the cutting blade 55, whereas the parallel aperture 112 is parallel.

In the embodiment depicted in FIG. 7, a lead drive assembly drives the oscillating frame 110 and thereby drives the oscillating action of the blade 55. As the rotary shaft 75 rotates the drive pulley 80, a drive shaft 117 connected to the underside of the drive pulley 80 also rotates. The drive shaft 117 passes through a shaft aperture 82 and engages the perpendicular aperture 111 in the oscillating frame 110 by an offset link 115 and a free roller 116. One end of the link 115 is secured to the end of the drive shaft 117, and the other end of the link 115 is secured to the free roller 116. As the drive shaft 117 rotates, the link 116 rotates as well, such that the second end of the link 115 rotates about the first end, which is pinned to the drive shaft 117. The drive shaft is oriented above the midpoint of the perpendicular aperture 111. The link 115 is situated directly above the perpendicular aperture 111, and the free roller 116 is engaged within the perpendicular aperture 111 and free to move within the plane of the perpendicular aperture 111. The link 115 is sized such that the distance from the point where the link 115 is secured to the drive shaft 117 to the point where the free roller 116 is secured to the link 116, plus the radius of the free roller 116, is equal to half the length of the perpendicular aperture 111. The free roller 116 is free to move relative to the perpendicular aperture 111.

At the same time, a stationary roller 120 is secured to the bottom plate 29 and engages with the parallel aperture 112. The stationary roller 120 is fixed in one location on the bottom plate 29, such that the oscillating frame 110 is free to move within the plane parallel to the cutting blade 55 but cannot move perpendicularly to the cutting blade 55. As the drive shaft 117 rotates, the free roller 116 rotates about the drive shaft 117. The free roller 116 is free to oscillate perpendicularly to the cutting blade 55 within the perpendicular aperture 111, but as the free roller 116 oscillates parallel to the cutting blade 55, it causes the oscillating frame 110 to oscillate in a direction parallel to the cutting blade 55. At the same time, the oscillating frame 110 is prevented from moving perpendicularly to the cutting blade 55 because the stationary roller 120 is situated within the parallel aperture 112 and permits the oscillating frame 110 to only move in a direction parallel to the cutting blade 55. This results in the oscillatory cutting motion of the blade 55 when the motor 65 is engaged.

FIG. 7 depicts only one method for driving the cutting blade 55. For example, a belt or gear drive assembly may also be fashioned to drive the cutting blade 55, without departing from the scope of this disclosure. Other methods of creating oscillatory motion are known and may be used without departing from the scope of this disclosure. Further, with respect to the embodiment depicted in FIG. 7, the size of rollers 116 and 120 and the apertures 111 and 112 may be varied to alter the oscillation amplitude and frequency as desired.

To operate the harvester, a user grasps the handle 11 in one hand and operates the motor 65 with the other hand. The user may adjust the feet 24 to set a constant cutting height above the ground. The user may adjust the cutting height based on the leaf growth. For example, in a year with a particularly good harvest, the leafy vegetables tend to grow very densely and have larger leaves and longer stems. Therefore, a higher cutting height may be preferred. In contrast, during dry years with low harvests, the leafy vegetables will grow less densely, such that the leaves tend to droop rather than grow straight up. Additionally, the vegetables will not grow as tall. Therefore, a lower cutting height may be preferred.

When turned on, the motor 65 drives the cutting blades 55 via the oscillatory drive mechanism 105 described above with reference to FIG. 7. The cutting blades 55 cut the leafy vegetables at the desired height. The motor also drives the brush 49 to sweep the cut leaves into the basket 30. As stated above with reference to FIG. 1, while any type of bristle 50 may be used in accordance with the harvester disclosed within, soft bristles 50 may be preferred in order to minimize bruising or damage to the leaves, which can impact their marketability and freshness. Also, while any number of bristles 50 may be used, more bristles 50 may be preferred, because additional bristles 50 serve to sweep the harvested leaves away from the cutting blades 55 more efficiently.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A harvester for leafy vegetables comprising:
   a) a square vertical frame with a handle;
   b) a motor mounted to a side of the frame;
   c) a rotary shaft driven by the motor;
   d) a rotating brush mounted to the frame and having multiple limp bristles;
   e) a drive wheel mounted to the end of the rotating brush;
   f) a belt driven by the rotary shaft for rotating the drive wheel;
   g) a cutting blade movably mounted to the bottom of the frame;
   h) an oscillatory drive mechanism engaged by the rotary shaft to drive the cutting blade, the mechanism comprising
      I) a drive shaft driven by the rotary shaft;
      II) an oscillatory frame comprising
         A) an opening perpendicular to the cutting blade and
         B) an opening parallel to the cutting blade;
      III) a link perpendicular to and secured on the end of the drive shaft;
      IV) a free roller secured to the link and offset from the drive shaft, and engaging the opening perpendicular to the cutting blade; and
      V) a stationary roller fixed relative to the oscillatory frame and engaging the opening parallel to the cutting blade;

i) a basket mounted to the frame for catching greens; and
j) adjustable feet attached to the bottom of the frame for adjusting the cutting height.

2. A harvester for leafy vegetables comprising:
a frame;
a motor secured to the frame, the motor comprising a rotary shaft;
a rotatable brush mounted to the frame and connected to the rotary shaft, the brush comprising multiple bristles;
an oscillatory drive mechanism connected to the rotary shaft, where the oscillatory drive mechanism comprises a drive shaft connected to the end of the rotary shaft;
an oscillatory frame that oscillates when driven by the drive shaft, where the cutting blade is secured to the oscillatory frame, the oscillatory frame comprising an aperture perpendicular to the cutting blade and an aperture parallel to the cutting blade;
a link substantially perpendicular to the drive shaft and secured to the end of the drive shaft,
a free roller secured to the link and offset from the drive shaft, and engaging the perpendicular aperture, and
a stationary roller fixed relative to the oscillatory frame and engaging the parallel aperture;
a cutting blade mounted to the frame below the bristles and secured to the oscillatory drive mechanism; and
an enclosure for collecting cut leaves.

3. The harvester of claim 2, where the rotatable brush is connected to the rotary shaft by a belt drive.

4. The harvester of claim 3, further comprising a drive wheel secured to the brush, such that the belt drive rotates the drive wheel.

5. The harvester of claim 2, where the bristles are limp.

6. The harvester of claim 2, where the motor is detachably mounted to the harvester.

7. The harvester of claim 2, where the frame further comprises adjustable feet for setting a cutting height.

8. The harvester of claim 2, where the enclosure is a basket.

* * * * *